US012803813B2

(12) United States Patent
Mainardi

(10) Patent No.: US 12,803,813 B2
(45) Date of Patent: Nov. 17, 2026

(54) SYSTEMS AND METHODS FOR MESSAGE AUTHENTICATION USING EFFICIENT SIGNATURES AND SECRET SHARING

(71) Applicant: PACKETFABRIC, INC., Culver City, CA (US)

(72) Inventor: Nicholas Mainardi, Culver City, CA (US)

( * ) Notice: Subject to any disclaimer, the term of this patent is extended or adjusted under 35 U.S.C. 154(b) by 331 days.

(21) Appl. No.: 17/989,965

(22) Filed: Nov. 18, 2022

(65) Prior Publication Data

US 2023/0163974 A1 May 25, 2023

Related U.S. Application Data

(60) Provisional application No. 63/281,193, filed on Nov. 19, 2021.

(51) Int. Cl.
*H04L 9/32* (2006.01)
*H04L 9/08* (2006.01)

(52) U.S. Cl.
CPC ............ *H04L 9/3242* (2013.01); *H04L 9/085* (2013.01); *H04L 9/3247* (2013.01); *H04L 2209/46* (2013.01)

(58) Field of Classification Search
CPC ..... H04L 9/3242; H04L 9/085; H04L 9/3247; H04L 2209/46
See application file for complete search history.

(56) References Cited

U.S. PATENT DOCUMENTS

| | | | | |
|---|---|---|---|---|
| 2002/0087865 A1* | 7/2002 | Eskicioglu | H04L 9/3242 | 713/168 |
| 2007/0162757 A1* | 7/2007 | Mache | H04L 63/061 | 713/176 |
| 2010/0058070 A1* | 3/2010 | Garay | H04L 9/3242 | 711/E12.092 |
| 2010/0199094 A1* | 8/2010 | Ho | H04L 63/0428 | 713/171 |
| 2011/0238989 A1* | 9/2011 | Machani | H04L 9/3242 | 713/168 |

(Continued)

OTHER PUBLICATIONS

M. Ito, A. Saito, and T. Nishizeki, Secret sharing schemes realizing general access structures. Proceedings of IEEE Global Telecommunication Conference, Globecom 87, 1987.

(Continued)

*Primary Examiner* — Yonas A Bayou
(74) *Attorney, Agent, or Firm* — Watts Law LLC

(57) ABSTRACT

A method for message authentication includes computing a first secret data and a second secret data using a signing key associated with a first communication message. The method includes splitting the first secret data and the second secret data into shares among a plurality of key holders n for storage at the plurality of key holders n. The method includes receiving a reconstruction request to compute a hash-based message authentication code (HMAC) signature for the first communication message employing the shares from at least $t \leq n$ of the plurality of key holders n to compute the signature with a Secure Multi-party Computation (SMC) protocol. Further the method includes computing the signature using the shares from the at least $t \leq n$ of the plurality of key holders n as inputs to the SMC protocol in place of the signing key.

10 Claims, 7 Drawing Sheets

(56) References Cited

U.S. PATENT DOCUMENTS

| | | | | |
|---|---|---|---|---|
| 2011/0302418 | A1* | 12/2011 | Fujisaki | H04L 9/0643 713/179 |
| 2013/0198518 | A1* | 8/2013 | Ran | H04L 63/08 713/170 |
| 2015/0098563 | A1* | 4/2015 | Gulley | H04L 9/3242 380/28 |
| 2016/0087791 | A1* | 3/2016 | Campbell | H04L 9/3239 380/28 |
| 2016/0094988 | A1* | 3/2016 | Lee | H04L 9/0825 380/270 |
| 2016/0350861 | A1* | 12/2016 | Loughlin-Mchugh | H04L 9/3242 |
| 2017/0272251 | A1* | 9/2017 | Osheter | H04L 63/062 |

OTHER PUBLICATIONS

A. Shamir, How to share a secret. Communications of ACM, 1979.

X. Wang, S. Ranellucci and J. Katz, Global-Scale Secure Multiparty Computation. Proceedings of the 2017 ACM SIGSAC Conference on Computer and Communications Security, CCS 2017, 2017.

* cited by examiner

SYSTEMS AND METHODS FOR MESSAGE AUTHENTICATION USING EFFICIENT SIGNATURES AND SECRET SHARING

RELATED APPLICATIONS

This application claims priority to U.S. Prov. Application Ser. No. 63/281,193 filed on Nov. 19, 2021, which is expressly incorporated herein by reference.

BACKGROUND

Hash-Based Message Authentication Codes (HMAC) can provide message authentication using a shared secret with knowledge of a signing key. For example, a keyed-hash message authentication code for a signing key K and a message M (i.e., HMAC(K,M)) is a short signature that can be correctly computed only with the knowledge of the signing key K. This prevents any entity with no knowledge of the signing key K from tampering with the messages sent between entities with the knowledge of K. In this scenario, the entity sending a message M (i.e., the sender) computes HMAC(K,M), sending it altogether with the message, and the entity receiving the message (i.e., the receiver) can verify the integrity of the received message by recomputing the HMAC for the received message and comparing it with the HMAC received from the sender. Since no entity without the knowledge of the key K can compute a valid HMAC for a different message than the one sent by the sender, the receiver can easily detect if the received message matches the one sent by the sender or not.

Furthermore, a message M is signed in a threshold fashion when the signing key is split among a set of $n \geq 2$ key holders, and any subset of $t \leq n$ key holders can collaboratively compute the signature. In one implementation of a threshold signature for the HMAC hinges upon two building blocks: a protocol for secure multi-party computation (SMC) and a t-out-of-n secret sharing scheme. With respect to the first building block, given a set of m entities, called parties, an SMC protocol allows such set of parties to jointly compute a generic function over the private inputs of each party while ensuring the confidentiality of the input values of a party against all the other parties. More specifically, given a function F and the private inputs $(x_1, x_2, \ldots, x_m)$ of the m parties, the SMC protocol allows the parties to compute $F(x_1, x_2, \ldots, x_m)$, ensuring that each party learns throughout the computation no more information than its input and the output of the computation. The SMC protocol allows to specify the function F to be evaluated either as a sequence of Boolean operations (bitwise XOR, AND) or as a sequence of arithmetic operations (integer additions and multiplications).

With respect to the second building block, a t-out-of-n secret sharing scheme allows to split a secret information, such as a secret key, in n shares in such a way that at least $t \leq n$ shares are needed to reconstruct the secret information. In general, secret sharing schemes allow for distributive storing of a sensitive information among n parties instead of a single party, thus reducing the risks that this information may be leaked to unauthorized or malicious entities. A t-out-of-n secret sharing scheme improves the reliability in this scenario since only $t \leq n$ shares are sufficient to reconstruct the secret information stored by the n parties, and so the secret can still be reconstructed even if up to n-t parties are unavailable.

One solution for threshold HMAC signature can be obtained by combining an optimal t-out-of-n secret sharing scheme (e.g., Shamir's secret sharing), which is employed to split the signing key among n key holders, with an SMC protocol, which is jointly run by at least t parties to compute the signature. In particular, the SMC protocol is employed to compute a function F that first reconstructs the signing key from t secret shares, provided as private inputs to the protocol by each of the involved parties, and then it computes the HMAC signature. The function F can thus be conceived as the composition of two functionalities: $F_{KR}$ and $F_{HMAC}$, corresponding to Key Reconstruction (KR) of the signing key K from the t shares and the computation of HMAC(K,M), respectively. The problem with this solution is that there is no SMC protocol that allows to efficiently evaluate both $F_{KR}$ and $F_{HMAC}$. In fact, $F_{HMAC}$ can be efficiently evaluated only by an SMC protocol that computes the output of the evaluated function by applying a sequence of bitwise XOR/AND operations (i.e., employing a Boolean circuit for the function being evaluated). Additionally, the Boolean circuit that represents $F_{KR}$, when Shamir's Secret Sharing is employed to split the signing key, is a big and complex circuit, making the evaluation of $F_{KR}$ with the same SMC protocol employed for $F_{HMAC}$ inefficient.

This problem may be overcome if a replicated t-out-of-n secret sharing scheme (as discussed in M. Ito, A. Saito, and T. Nishizeki, "Secret sharing schemes realizing general access structures", Proceedings of IEEE Global Telecommunication Conference, Globecom 87, 1987) is employed in place of the Shamir's Secret Sharing. Nonetheless, while Shamir's Secret Sharing is optimal, as each share exhibits the same size of the secret information and each party has to store only one share, the former secret sharing scheme requires each party to store $$\binom{n-1}{t-1}$$

shares of the signing key, which makes this alternative solution poorly scalable when the number of parties increases. Accordingly, systems and methods for efficient HMAC signatures with secret sharing is desirable.

BRIEF DESCRIPTION

According to one aspect, a computer-implemented method for message authentication includes computing a first secret data and a second secret data using a signing key associated with a first communication message. The method includes splitting the first secret data and the second secret data into shares among a plurality of key holders n for storage at the plurality of key holders n. The method includes receiving a reconstruction request to compute a hash-based message authentication code (HMAC) signature for the first communication message employing the shares from at least $t \leq n$ of the plurality of key holders n to compute the signature with a Secure Multi-party Computation (SMC) protocol. Further, the method includes computing the signature using the shares from the at least $t \leq n$ of the key holders n as inputs to the SMC protocol in place of the signing key.

According to another aspect, a system for message authentication includes a key owner, a plurality of key holders n, a requester, and a processor operatively connected for computer communication to the key owner, the plurality of key holders n, and the requester. The processor computes a first secret data and a second secret data using a signing key from the key owner and associated with a first communication message. The processor splits the first secret data and the second secret data into shares among the plurality of key holders n for storage at the plurality of key holders n. The processor receives, from the requester, a reconstruction request to compute a hash-based message authentication code (HMAC) signature for the first communication message employing the shares from at least t≤n of the plurality of key holders n to compute the signature with a Secure Multi-party Computation (SMC) protocol. Further, the processor computes the signature using the shares from the at least t≤n of the key holders n as inputs to the SMC protocol in place of the signing key.

According to a further aspect, a non-transitory computer-readable storage medium including instructions that when executed by a processor, causes the processor to compute a first secret data and a second secret data a signing key associated with a first communication message. The processor is caused to split the first secret data and the second secret data into shares among a plurality of key holders n for storage at the plurality of key holders n. Further the processor is caused to receive a reconstruction request to compute a hash-based message authentication code (HMAC) signature for the first communication message employing the shares from at least t≤n of the plurality of key holders n to compute the signature with a Secure Multi-party Computation (SMC) protocol. The processor is caused to compute the signature using the shares from the at least t≤n of the key holders n as inputs to the SMC protocol in place of the signing key.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1A:
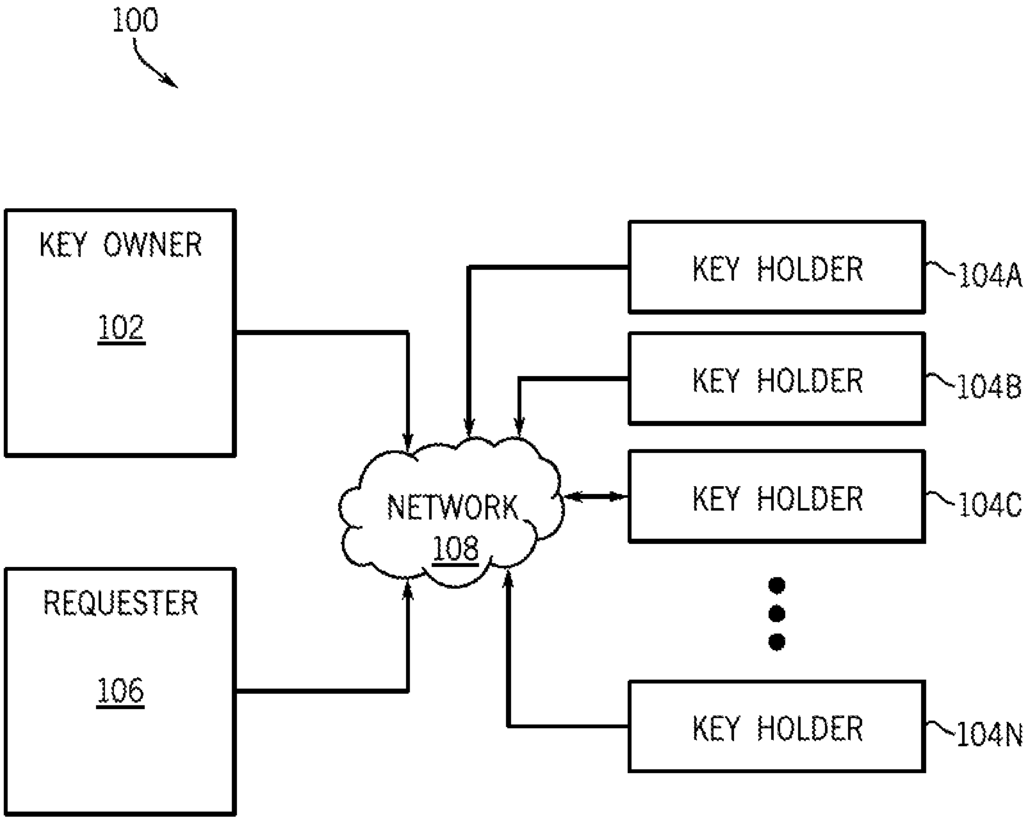
FIG. 1A is a block diagram of a system for message authentication according to one exemplary embodiment.

The systems and methods described herein are directed to authentication techniques computing threshold Hash-Based Message Authentication Codes (HMAC). Generally, the systems and methods employ n≥2 entities, called key holders, which collaboratively store the signing key K received from another entity, called a key owner. Two phases are described herein: a setup phase, where the signing key K for the HMAC is distributed by the key owner to the key holders; and a signing phase, where HMAC signatures can be collaboratively computed by any subset with at least t≤n key holders, where t is a parameter called threshold. Having multiple entities involved in the computation of an HMAC signature reduces the risks of key theft, since the key is split among multiple key holders, and reduces the risks of key misuse, as the message being signed can be validated by multiple key holders, preventing a single rogue key holder from obtaining a signature for a message arbitrarily chosen by itself.

In the setup phase, the key owner, holding the signing key K, derives from K two secret data, referred to as $K_{ipad}$ and $K_{opad}$, which can be employed as inputs to the HMAC computation in place of the signing key K; then, the key owner splits both $K_{ipad}$ and $K_{opad}$ in n shares with t-out-of-n secret sharing scheme (e.g., Shamir Secret Sharing), following a secret splitting strategy proposed in this invention that allows to reconstruct the secret information with a negligible number of bitwise operations which can be efficiently evaluated with an SMC protocol employing Boolean circuits as a representation for the function being computed.

In the signing phase, any subset T of at least t key holders can collaboratively compute an HMAC signature for a message M. Specifically, the key holders belonging to T jointly execute a SMC protocol to securely evaluate a function F that, given as input the message M and the shares of both $K_{ipad}$ and $K_{opad}$ hold by the key holders in subset T, first reconstructs both $K_{ipad}$ and $K_{opad}$ and then it computes the HMAC signature of the message M with signing key K. Each of the key holders in subset T provides as its private input to the SMC protocol a share of $K_{ipad}$ and a share of $K_{opad}$, which were obtained during the setup phase; the secret splitting strategy proposed in this invention to compute such shares allows to employ a simple Boolean circuit to reconstruct $K_{ipad}$ and $K_{opad}$ from the secret shares provided by the key holders, which can be efficiently evaluated by the jointly run SMC protocol. Remarkably, such Boolean circuit for secret reconstruction is composed only by XOR operations, which can be evaluated with a minimal overhead in a SMC protocol.

The message M to be signed with HMAC, which is assumed to be known by all the key holders, must be jointly provided by all the key holders as input to the SMC protocol, in order to avoid that a single party may arbitrarily change the message being signed. Therefore, a secure solution for threshold HMAC signatures must hinge upon a SMC protocol that allows to guarantee that a valid signature is obtained only if all the key holders involved in the computation provide the same message M as input to the protocol at hand. Unfortunately, not all SMC protocols can provide this guarantee. In the embodiments described herein, a specific SMC protocol proposed in X. Wang, S. Ranellucci and J. Katz, Global-Scale Secure Multiparty Computation. Proceedings of the 2017 ACM SIGSAC Conference on Computer and Communications Security, CCS 2017, 2017 is described however, it is understood that other SMC protocols may be employed.

I. System Overview

Referring now to the drawings, wherein the showings are for purposes of illustrating one or more exemplary embodiments and not for purposes of limiting same, FIG. 1 is a block diagram of a system 100 for message authentication according to one exemplary embodiment. The system 100 includes a key owner 102 and multiple key holders 104, namely, a key holder 104A, a key holder 104B, a key holder 104C, and a key holder 104N. The system 100 also includes a requester 106 and a network 108. Each of the key owner 102, the key holders 104, and the requester 106 may be operatively connected for computer communication, for example, via the network 108. It is understood that the components of the system 100, as well as the components of other systems, hardware architectures, and software architectures discussed herein, can be combined, omitted, or organized into different architectures for various embodiments.

Figure 1B:
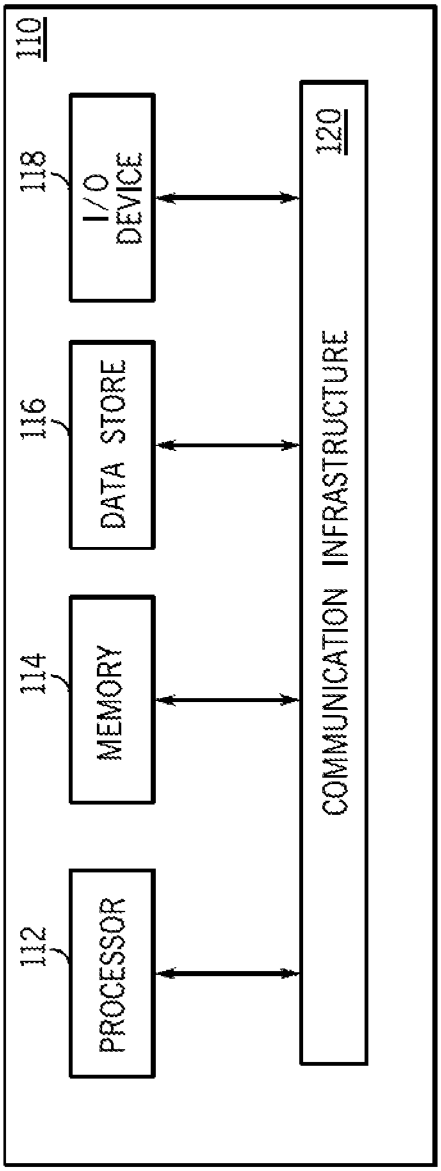
FIG. 1B is a block diagram of an exemplary computing device (e.g., computing nodes) operatively connected for computer communication with the system of FIG. 1A.

Generally, the key owner 102, the key holders 104, and/or the requester 106 can be any type of computing device and/or computing node (e.g., servers, PCs, mobile phones). In some embodiments, these computing nodes belong to either the same organization or to multiple organizations, as well as hybrid scenarios where multiple organizations may control multiple key holders. Referring now to FIG. 1B a block diagram of and exemplary computing device 110 (e.g., a computing node) is shown. In general, the computing device 110 includes a processor 112, a memory 114, a data store 116, an input/output (I/O) device 118, and communication interface 120 each operatively connected for computer communication via a bus (not shown) and/or other wired and wireless technologies defined herein. It is understood that one or more of the components of the system 100 in FIG. 1A can include one or more of the components and/or execute one or more of the functionalities of the components shown in FIG. 1B.

The processor 112 may include logic circuitry with hardware, firmware, and software architecture frameworks for facilitating the methods, functions, and components as described herein. In some embodiments, the processor may store circuits, application frameworks, kernels, libraries, drivers, application program interfaces, among others, to execute and control hardware and functions discussed herein. In some embodiments, the memory 114 and/or the data store 116 may store similar components as the processor 112 for execution by the processor. The I/O device 118 may include one or more input-output devices for providing visual, audio, and/or tactile input and/or output from and/or to another entity (e.g., an operator). The I/O device 118 may be a monitor, display, keyboards, touch screens, speakers, among other devices.

The communication interface 118 can include software and hardware to facilitate data input and output between the components of the computing device 110 and other components of the system 100. Specifically, the communication interface 118 can include network interface controllers (not shown) and other hardware and software that manages and/or monitors connections and controls bi-directional data transfer between the communication interface 118 and other components of the computing device 110 and the system 200 using, for example, the network 108. The systems and methods for message authentication will now be described in more detail with reference to the above described components of FIGS. 1A and 1B.

II. Setup Phase

Figure 3:
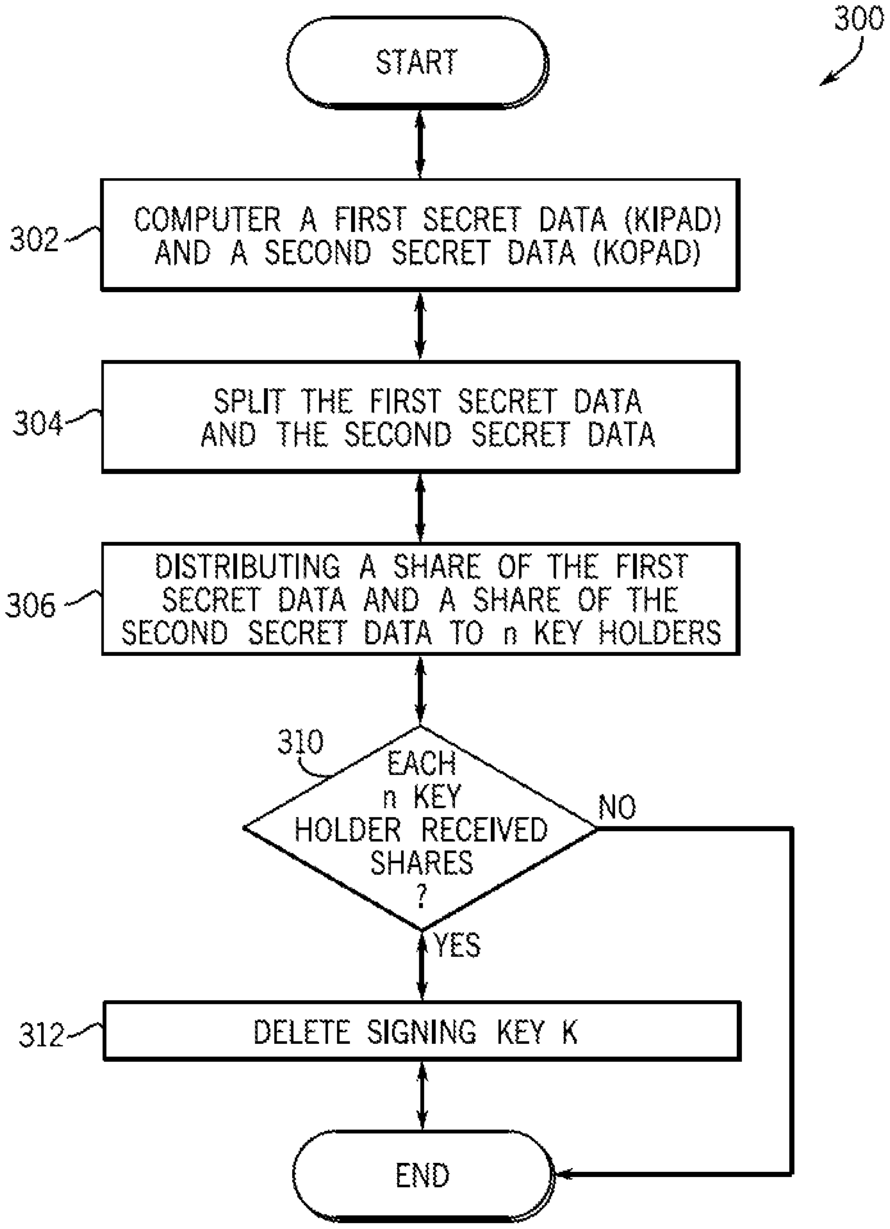
FIG. 3 is a flow diagram of a method for message authentication during a setup phase according to an exemplary embodiment.

As mentioned above, the systems and methods described herein include a setup phase, where the key owner 102, which holds the signing key K, computes secret data $K_{ipad}$ and secret data $K_{opad}$ derived from the signing key K. The key owner 102 securely splits such data among the n key holders 104 with a Shamir Secret Sharing scheme. Once, the key owner 102 has acknowledged that all the key holders 104 have received their share of the secret data, the key owner 102 can safely erase the signing key K to prevent key theft threats. In some embodiments, instead of deleting the signing key K, it can be stored offline (e.g., cold storage solution). The setup phase will now be described in more detail with reference to the method 300 of FIG. 3.

At block 302, the method 300 includes computing a first secret data and a second secret data using a signing key associated with a first communication message. The secret data $K_{ipad}$ and $K_{opad}$ represent intermediate values obtained during the computation of an HMAC signature that depend only on the signing key K (i.e., independent from the message being signed): therefore, these intermediate values can be computed once during the setup phase and employed in place of the signing key K for all the HMAC signatures that must be computed with such key. Said differently, the first secret data and the second secret data are computed independently and/or are not derived from the first communication message M being signed.

More specifically, the computation of $K_{ipad}$ and $K_{opad}$ will now be described in more detail. HMAC relies on a collision-resistant hash function H, such as SHA-2 or SHA-3, which is employed as a building block. For an underlying hash function H with input blocks of B bytes, the HMAC computation for a signing key K and a message M is defined as:

$$HMAC(K, M) = H((K \oplus opad) \| H((K \oplus ipad) \| M)) \quad (1)$$

where || denotes the concatenation of two bit-strings, opad is the outer padding, given by B bytes with value 0x5c, ipad is the inner padding, given by B bytes with value 0x36, and the signing key K is padded to B bytes adding trailing bytes with value 0x00

Figure 4:
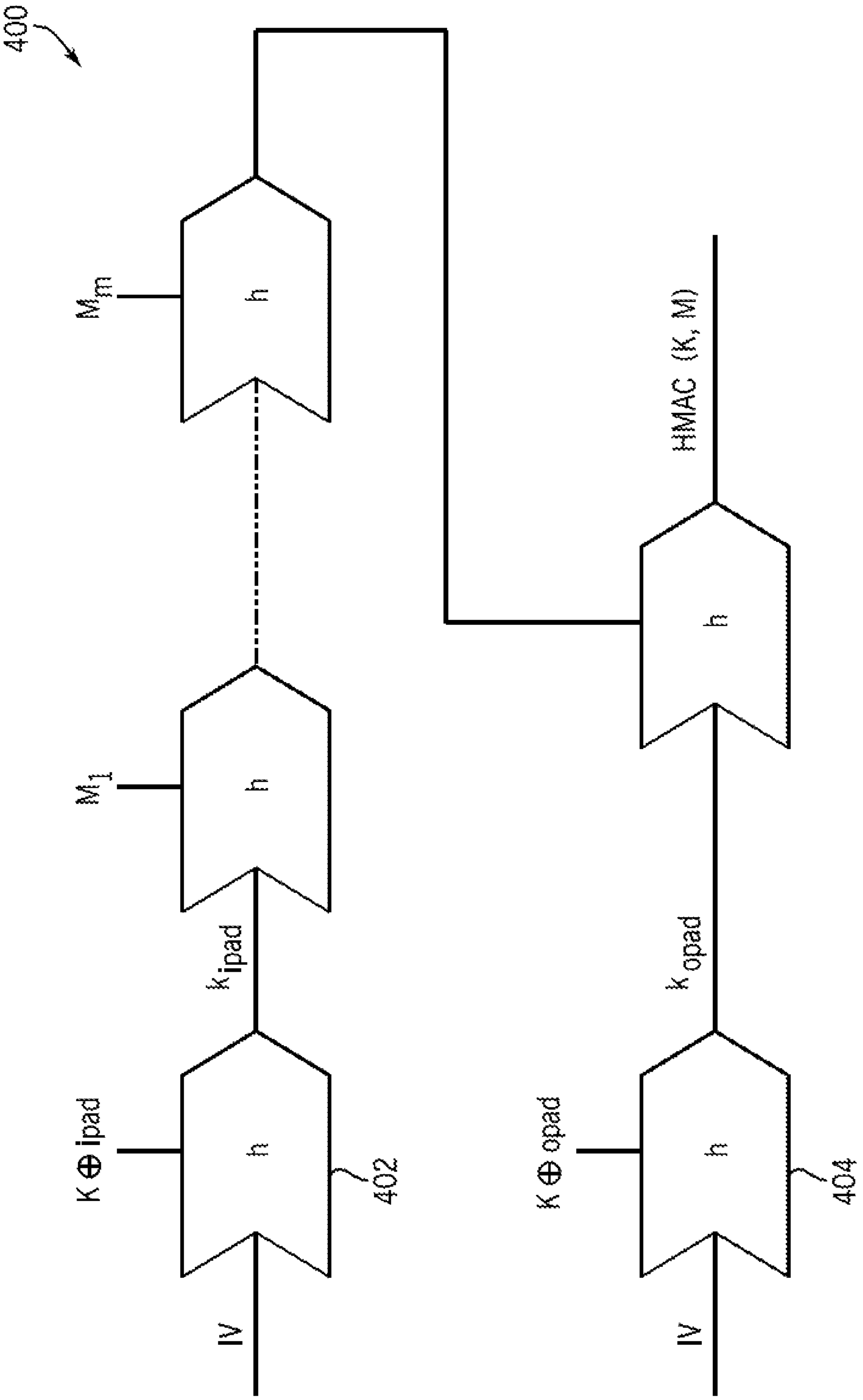
FIG. 4 is a block diagram of an exemplary circuit for computation of HMAC for a message according to one exemplary embodiment.

If the input of the hash function is larger than the block size B, then such payload is split in chunks of B bytes, and each chunk is sequentially processed by the hash function through a compression function. Such function takes as input a chunk of B bytes of the message to be hashed and the inner state of the hash function H, which is initialized to a constant value IV and it is overwritten after each execution of the compression function with the output of such function. FIG. 4 illustrates an HMAC computation circuit 400 which shows the computation of HMAC(K,M) for a message M with m chunks, employing the compression function h of the hash function H. From such construction, it is clear that the compression of both the inner padding 402 and the outer padding 404 are independent from the message M.

Accordingly, in order to avoid the re-computation of both k_ipad=h(IV,K⊕ipad) and k_opad=h(IV,K⊕opad) in every HMAC computation with the same signing key, the systems and methods described herein employ $K_{ipad}$ and $K_{opad}$ as inputs to the HMAC in place of the signing key K. This optimization, although applicable to any HMAC computation employing the same key, is particularly efficient when the HMAC is computed through a SMC protocol, given the higher overhead of evaluating the compression function h with a SMC protocol.

Once $K_{ipad}$ and $K_{opad}$ are computed by the key owner, each of them must be split in n≥2 shares and distributed among the key holders 104 *n*. Accordingly, with reference again to FIG. 3, at block 304 the method 300 includes splitting the first secret data and the second secret data into shares among a plurality of key holders n for storage at the plurality of key holders n. In one embodiment, at block 306, the method 300 can include distributing a share of the first secret data and a share of the second secrete data to the plurality of key holders n. In particular, both $K_{ipad}$ and $K_{opad}$ are split based on t-out-of-n secret sharing scheme (e.g., Shamir Secret Sharing). As will be discussed in further detail herein, this allows any subset of at least t key holders 104 *n* to efficiently reconstruct the signing key with a SMC protocol evaluating Boolean circuits during the signing phase.

Splitting the shares according to Shamir Secret Sharing will now be described in more detail. The elements are of a finite field as the Galois field with order $2^L$ (i.e., $GF(2^L)$) for an integer L such that $2^L \geq n$. The choice of this finite field is based on the following properties. First, there is a one-to-one mapping φ between elements in $GF(2^L)$ and bit-strings of L bits. Elements in $GF(2^L)$ are polynomials of degree at most L−1 with binary coefficients, which can be mapped to a bit-string of L bits by concatenating the L binary coefficients of the polynomial. Also, the addition between elements in $GF(2^L)$ is equivalent to the XOR between the corresponding bit-strings of L bits. This can be expressed mathematically as:

$$\forall\ e\_1, e\_2 \in GF(2\text{^}L): \varphi(e\_1 + e\_2) = \varphi(e\_1) \oplus \varphi(e\_2) \quad (2)$$

Accordingly, all the addition and multiplication operations reported represent additions and multiplications in the chosen finite field $GF(2^L)$. Considering a secret information S of k bits, which may represent either the signing key K, $K_{ipad}$ or $K_{opad}$, such secret is split by the key owner in n shares as follows. First, partition the secret S in $$\left\lceil \frac{k}{L} \right\rceil$$

chunks of L bits. For each chunk Sj, compute n shares with Shamir secret sharing over $GF(2^L)$. Specifically, choose a random polynomial Pj of degree t−1 such that $P_j(0)=s_j$ where $s_j$ is the element in $GF(2^L)$ corresponding to the L-bit chunk Sj according to mapping φ (i.e., $s_j=\varphi^{-1}(S_j)$). The i-th share is $$y_j^i = P_j(e_i),$$

where $e_i$ is a generic element of $GF(2^L)$ bounded only to the i-th key holder and known by all the key holders. The i-th party gets the share $$y_j^i$$

for each chunk.

The setup phase ends when all the secret data (i.e., both $K_{ipad}$ and $K_{opad}$) are shared among the key holders. However, the key owner can erase the secret S once all the n shares have been received by the key holders. Accordingly, at block 310, the method 300 includes determining if each of the key holders 104 *n* have received the shares. If YES, the method 300 proceeds to block 312, wherein the signing key K is deleted. If NO, the method 300 ends. It is understood that in some embodiments, at block 312, instead of deleting the signing key K, a cold storage solution can be implemented. For example, the signing key K can be stored offline in a data store by the key owner 102.

III. Signing Phase

Figure 5:
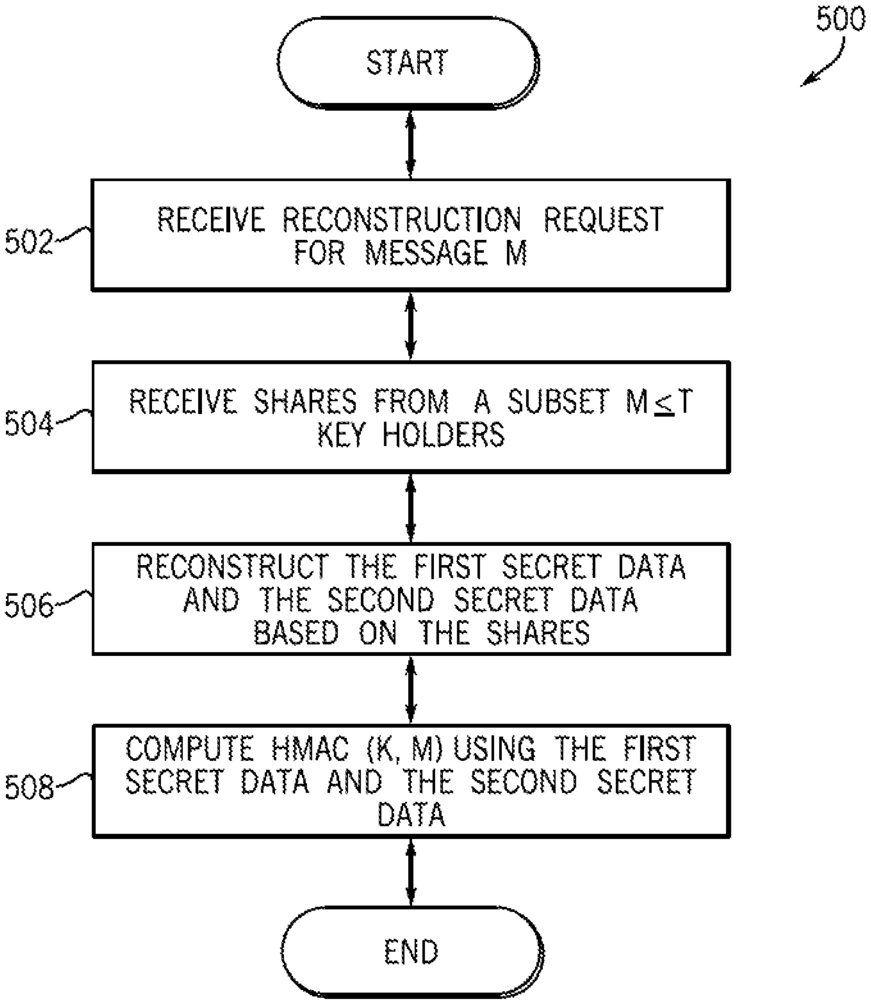
FIG. 5 is a flow diagram of a method for message authentication during a signing phase according to an exemplary embodiment.

Once the setup phase is over, the set of key holders 104 are ready to compute signatures with the signing key K. Referring now to FIG. 5, a method 500 illustrating the signing phase will now be described in more detail. At block 502, the method 500 includes receiving a reconstruction request for a message M to compute a hash-based message authentication code (HMAC) signature for the first communication message employing the shares from at least t≤n of the plurality of key holders n to compute the signature with a Secure Multi-party Computation (SMC) protocol. In some embodiments, the request to compute a signature for a given message M may come from a third party or by any of the key holders 104. In the embodiments described herein, and as shown in FIG. 1A, the requester 106 transmits a reconstruction request to compute a signature for the first communication message M. Such request, which encompasses the message M to be signed, is sent by the requester 106 to all the key holders 104. As will be discussed herein, any subset with m≥t key holders 104 can jointly compute the HMAC signature. The m key holders 104 involved in the collaborative signature computation may also be referred to as signing parties. The signature is computed by hinging upon any SMC protocol that allows to evaluate an arbitrary Boolean circuit. In particular, the present invention mandates that the m signing parties should jointly evaluate with a SMC protocol the Boolean circuit 200 in FIG. 2. The Boolean circuit 200 is obtained as a composition between a Boolean circuit 204 that computes the HMAC signature from the secret data $K_{ipad}$, $K_{opad}$ and the message M, with a Boolean circuit 202 that reconstructs the secret data $K_{ipad}$ and $K_{opad}$ from the shares provided by each of the signing parties, connecting the output wires 210 of the latter circuit to the input wires 206 of the former circuit. The security properties of the SMC protocol guarantee that no information about the reconstructed secret data can be learned by any party involved in the SMC protocol evaluating the composed Boolean circuit 200.

Accordingly, at block 504, the method 500 includes receiving the shares from at least t≤n of the key holders 104 *n*. In one embodiment, at block 506, the method 500 includes reconstructing the first secret data and the second secret data based on the shares. For example, the Boolean circuit 202 reconstructs the secret data $K_{ipad}$ and $K_{opad}$ from the shares obtained by each of the signing parties during the setup phase. In one embodiment, instead of employing such shares directly as inputs to the Boolean circuit 202, all the signing parties provide as their secret inputs to the Boolean circuit 202 ephemeral shares, which are one-time shares locally computed by each party from the original shares obtained from the setup phase. More specifically, considering a set T with at least t signing parties, given a share $$y_j^i$$

of the j-th chunk of a secret S hold by the i-th party in T, the ephemeral share $$S_J^i$$

is computed as $$S_j^i = y_j^i \Pi_{k \in T, k \neq i} \left( \frac{e_k}{e_k - e_i} \right),$$

where $\{e_k | k \in T\}$ are the elements of $GF(2^L)$ bound to each of the signing parties and publicly known by all the parties. All the arithmetic operations are performed over the finite field $GF(2^L)$ employed in the setup phase when computing the shares.

By employing ephemeral shares instead of original ones, the j-th chunk $S_j$ of a secret S can then be easily reconstructed as the sum over $GF(2^L)$ of the ephemeral shares provided by all parties for that chunk, that is $$S_j = \sum_{i \in T} S_j^i.$$

Figure 6:
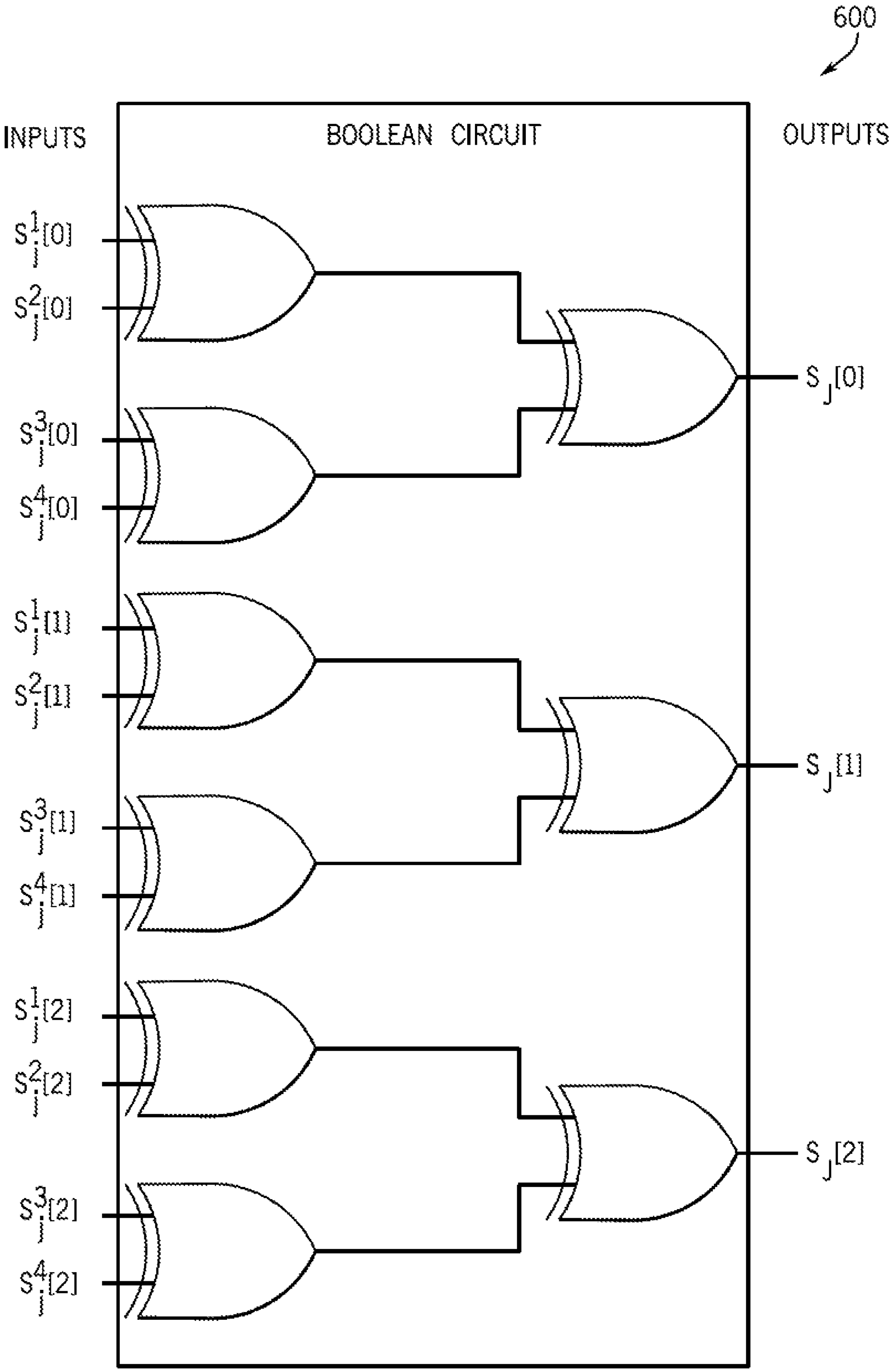
FIG. 6 is a block diagram of a Boolean circuit according to one exemplary embodiment.

Because of the second property stated earlier for the field $GF(2^L)$, this summation can be equivalently performed as the bitwise XOR of all the ephemeral shares, therefore the present invention proposes as the Boolean circuit 202 to reconstruct a secret S a simple circuit made by a set of XOR gates combining together the corresponding bits of all the ephemeral shares. An example of this is shown in FIG. 6 by Boolean circuit 600 as reconstructing a 3-bit chunk $S_j$ from m=4 ephemeral shares over $GF(2^3)$. The benefit of the Boolean circuit 600 is that the XOR gates can be efficiently evaluated with a SMC protocol evaluating Boolean circuits, therefore the reconstruction of the secret data $K_{ipad}$ and $K_{opad}$ preceding the actual signature computation exhibits a negligible overhead.

Accordingly, in the signing phase a set of m≥t signing parties (e.g., the key holders 104) evaluates with a SMC protocol the composed Boolean circuit 200, providing as input the message M to be signed and the ephemeral shares of both the secret data $K_{ipad}$ and $K_{opad}$ locally computed by each of the m signing parties from the original shares obtained during the setup phase, obtaining at the end of the SMC computation the HMAC(K,M). Thus, at block 508, the method 500 includes computing the signature using the shares from the at least t≤n of the key holders n as inputs to the SMC protocol in place of the signing key.

In some embodiments, it is important to ensure that each signing party can check the message being signed, in turn implying that the message M must be necessarily provided as input to the SMC protocol jointly by all the signing parties. If the message M was provided as an input to the SMC protocol by a single party, then such party may arbitrarily change such message, as each party has full control over its own inputs. Accordingly, the method described herein which allows all the parties involved in a SMC protocol to jointly provide a common input is specific to the SMC protocol. The described method can be employed by the signing parties to jointly provide the message M as a common input to the SMC protocol (as discussed in X. Wang, S. Ranellucci and J. Katz, "Global-Scale Secure Multiparty Computation", Proceedings of the 2017 ACM SIGSAC Conference on Computer and Communications Security, CCS 2017, 2017). The methods described herein modifies the Input Processing phase of the specific SMC protocol.

Figure 2:
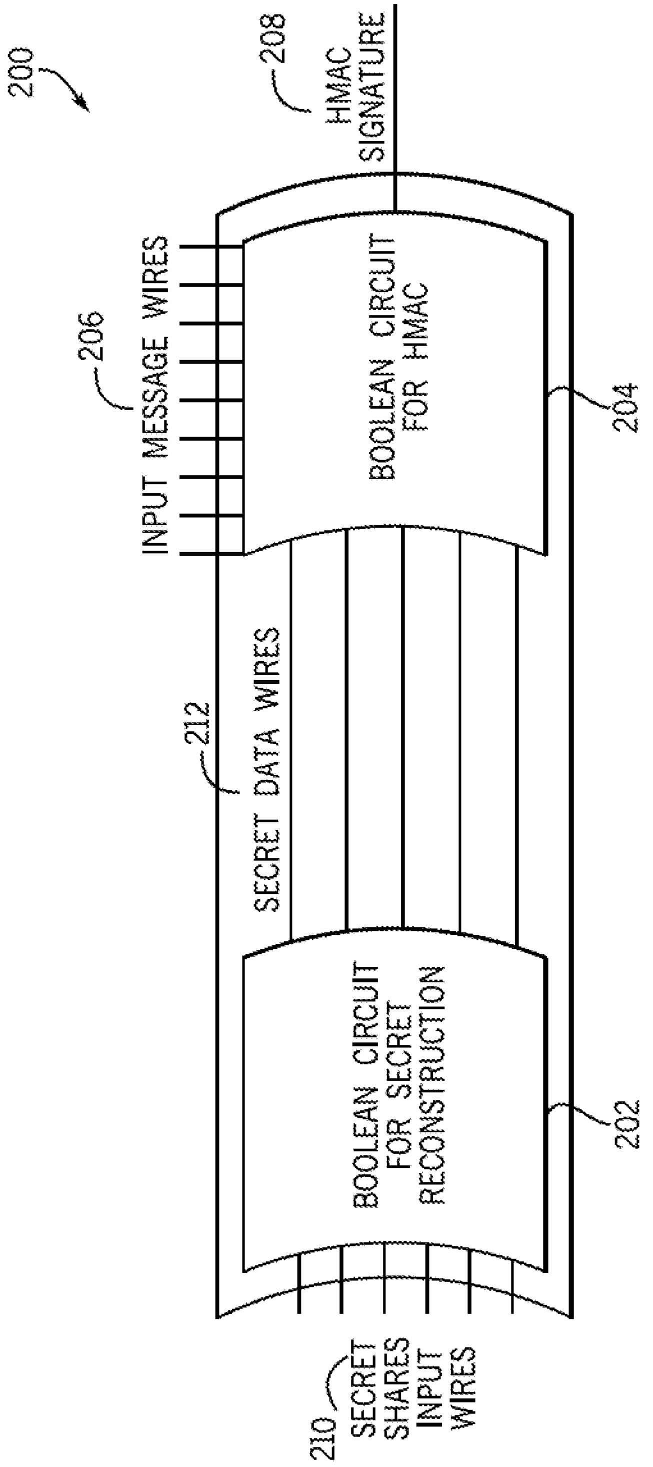
FIG. 2 is a block diagram of a Boolean circuit according to an exemplary embodiment.

With reference to the Boolean circuit 200 of FIG. 2, the input message wires 206 correspond to a set of wires $I_w$. Then, for each wire $w \in I_w$, each party broadcasts its authenticated random bit $$r_w^i$$

to all other parties, who can check the integrity of such bit as for any authenticated bit employed; each party locally computes $$\lambda_w = r_w^1 \oplus \ldots \oplus r_w^m$$

employing the authenticated random bits received from other parties and its own authenticated random bit; given the input bit $M_w$ of the message M corresponding to wire w, which is known by all parties, each party computes the masked input bit $x_w = \lambda_w \oplus M_w$; each party $P_i$, i≠1, sends to party $P_1$ the label $$L_{w,x_w}^i$$

corresponding to the masked input $x_w$ for the wire w; and party $P_1$ will employ the received labels $$\{L_{w,x_w}^i\}_{i \neq 1}$$

altogether with its locally computed masked input $x_w$ for the wire w to evaluate the Boolean circuit.

By following these steps, a correct signature can be obtained only if all the m parties employ the same input bit $M_w$ for all the wires $w \in I_w$ to compute the labels $$\{L_{w,x_w}^i\}_{i \neq 1}$$

and the masked input bit $x_w$. Indeed, if all the parties $P_i$, i≠1, provide labels for a masked input bit $x'_w \neq x_w$, then the integrity checks performed by $P_1$ during the evaluation of the circuit will fail, hence allowing $P_1$ to detect the misbehavior of the other parties. If the parties $P_i$, i≠1, provide labels corresponding to different masked input bits, that is there are at least two labels $$L_{w,x_w}^i, L_{w,x'_w}^j \text{ with } x'_w \neq x_w$$

for the same wire w, then $P_1$ will not be able to compute the correct output of the circuit, which means that it is not possible to obtain a valid signature for a message M'≠M. Based on the above, all parties must agree on the message M to be signed in order to obtain a valid signature, which is crucial to prevent misuses of a threshold HMAC signature solution.

IV. Use Cases and Advantages

The methods and systems describe herein a solution to securely and reliably employ a signing key K to perform HMAC signatures. Consider a scenario where a signing key K must be employed by an application to compute HMAC signatures. The signing key K represents a valuable asset for attackers, hence to decrease the likelihood of both key theft and key misuses, the key is split among $n \geq 2$ different machines, employing an SMC protocol to compute the HMAC signature. Without a threshold HMAC signature, the unavailability of a single machine is sufficient to prevent the computation of a signature, hence making the system poorly reliable. Conversely, by employing the methods and systems described herein, it is possible to configure a threshold t guaranteeing that the application can tolerate up to $n-t$ simultaneously unavailable machines without preventing HMAC signature computation, hence achieving a better trade-off between security and reliability.

Furthermore, since ephemeral shares can be used to reconstruct the keys via simple XOR operations, it is possible to combine a t-out-of-n secret sharing scheme with a trivial XOR-based n-out-of-n secret sharing scheme to achieve more complex access structures to compute HMAC signatures. For instance, consider an embodiment where a software company must authorize a code release by signing it with an HMAC signature, with the security requirement that at least $t_1$ members of the software development teams, at least $t_2$ members of the operations team and the CTO must authorize the operation. To ensure that this requirement is fulfilled, the secret S can be split among members of the organization. For example, the secret data S (i.e., $K_{ipad}$ and $K_{opad}$) is split in 3 shares $S_1$, $S_2$, $S_3$ such that $S_1 \oplus S_2 \oplus S_3 = S$. With such secret sharing scheme, all the 3 shares are necessary to reconstruct S. The share $S_1$ is then further split, employing the process described in the present invention, with a $t_1$-out-of-$n_1$ Shamir secret sharing, where $n_1$ is the size of the software development team. Each member receives one share. The share $S_2$ is similarly split with a $t_2$-out-of-$n_2$ Shamir secret sharing, where $n_2$ is the size of the operations team. Each member receives one share. Share $S_3$ is given to the CTO.

To authorize a critical operation, the parties need to compute an HMAC signature with signing key K. With such a splitting scheme, the HMAC signature can be computed by evaluating with a SMC protocol the Boolean circuit 200 described herein, which reconstructs the secret input as the XOR of all the shares provided by the parties involved in the computation and then computes the HMAC signature for the input message. At least $t_1+t_2+1$ parties must be involved in the SMC protocol: the secret S is correctly reconstructed only if at least $t_1$ parties are members of the development team (i.e., they own shares of $S_1$), at least $t_2$ parties are members of the operations team (i.e., they own shares of $S_2$) and the last party is the CTO holding the share $S_3$. The XOR of all the shares provided by members of the development team is equal to S1, the XOR of all the shares provided by members of the operations team is equal to S2, and thus the XOR of all these shares with S3 yields the secret S. Therefore, the desired security requirement on the parties required for signature computation is fulfilled, since a correct signature is obtained only if the secret is properly reconstructed with the SMC protocol, which happens only if such requirement is satisfied. It is understood that the methods and systems described herein can be applicable to other examples and use cases.

V. Definitions

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless area network (WAN), a wide area network (WAN), a metropolitan area network (MAN), a virtual private network (VPN), a cellular network, a token ring network, a point-to-point network, an ad hoc network, a mobile ad hoc network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

“Database,” as used herein, is used to refer to a table. In other examples, “database” may be used to refer to a set of tables. In still other examples, “database” may refer to a set of data stores and methods for accessing and/or manipulating those data stores. A database may be stored, for example, at a disk and/or a memory.

“Disk,” as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

“Logic circuitry,” as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

“Memory,” as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

“Operable connection,” or a connection by which entities are “operably connected,” is one in which signals, physical communications, and/or logical communications may be sent and/or received. An operable connection may include a wireless interface, a physical interface, a data interface, and/or an electrical interface.

“Processor,” as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

The embodiments discussed herein can also be described and implemented in the context of “computer-readable medium” or “computer storage medium.” As used herein, “computer-readable medium” or “computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for message authentication, comprising:

computing a first secret data and a second secret data using a signing key associated with a first communication message;

splitting the first secret data and the second secret data into a plurality of original shares;

distributing the plurality of original shares among a plurality of key holders n such that each of the plurality of key holders n stores at least one original share of the first secret data and at least one original share of the second secret data;

locally deriving, by at least t≤n of the plurality of key holders n, ephemeral shares from the original shares stored by the at least t≤n of the plurality of key holders n;

receiving a reconstruction request to compute a hash-based message authentication code (HMAC) signature for the first communication message, and reconstructing the first secret data and the second secret data from the ephemeral shares provided by the at least t≤n of the plurality of key holders n using a Secure Multi-party Computation (SMC) protocol; and computing the HMAC signature for the first communication message using the reconstructed first data secret and the reconstructed second data secret within the SMC protocol in place of the signing key.

2. The computer-implemented method of claim 1, wherein computing the first secret data and the second secret data is independent from the first communication message being signed.

3. The computer-implemented method of claim 1, further including upon determining that each of the plurality of key holders n received the original shares, deleting the signing key.

4. The computer-implemented method of claim 1, wherein reconstructing includes performing bitwise XOR operations on the ephemeral shares from the at least t≤n of the plurality of key holders n to reconstruct the first secret data and the second secret data.

5. A system for message authentication, comprising:

a key owner;

a plurality of key holders n;

a requester; and a processor operatively connected for computer communication to the key owner, the plurality of key holders n, and the requester, wherein the processor:

computes a first secret data and a second secret data using a signing key from the key owner and associated with a first communication message;

splits the first secret data and the second secret data into a plurality of original shares;

distributes the plurality of original shares such that each of a plurality of key holders n receives and stores at least one original share of the first secret data and at least one original share of the second secret data;

locally deriving, by at least t≤n of the plurality of key holders n, ephemeral shares from the original shares stored by the at least t≤n of the plurality of key holders n;

receives, from the requester, a reconstruction request to compute a hash-based message authentication code (HMAC) signature for the first communication message, and reconstructs the first secret data and the second secret data from the ephemeral shares provided by the at least t≤n of the plurality of key holders n to compute the signature with a Secure Multi-party Computation (SMC) protocol; and computes the HMAC signature for the first communication message using the reconstructed first data secret and the reconstructed second data secret within the SMC protocol in place of the signing key.

6. The system of claim 5, wherein the processor computes the first secret data and the second secret data independently from the first communication message being signed.

7. The system of claim 5, wherein the processor deletes the signing key upon determining that each of the plurality of key holders received the original shares.

8. A non-transitory computer-readable storage medium including instructions that when executed by a processor, causes the processor to:

compute a first secret data and a second secret data using a signing key associated with a first communication message;

split the first secret data and the second secret data into a plurality of original shares, distribute the plurality of original shares among a plurality of key holders n such that each of the plurality of key holders n stores at least one original share of the first secret data and at least one original share of the second secret data;

locally derive, by at least t≤n of the plurality of key holders n, ephemeral shares from the original shares stored by the at least t≤n of the plurality of key holders n;

receive a reconstruction request to compute a hash-based message authentication code (HMAC) signature for the first communication message, and reconstruct the first secret data and the second secret data from the ephemeral shares from the at least t≤n of the plurality of key holders n using a Secure Multi-party Computation (SMC) protocol; and compute the HMAC signature for the first communication message using the reconstructed first data secret and the reconstructed second data secret within the SMC protocol in place of the signing key.

9. The non-transitory computer-readable storage medium of claim 8, wherein the processor computes the first secret data and the second secret data independently from the first communication message being signed.

10. The non-transitory computer-readable storage medium of claim 8, further causing the processor delete the signing key upon determining that each of the plurality of key holders n received the original shares.

* * * * *